Patented Mar. 27, 1934

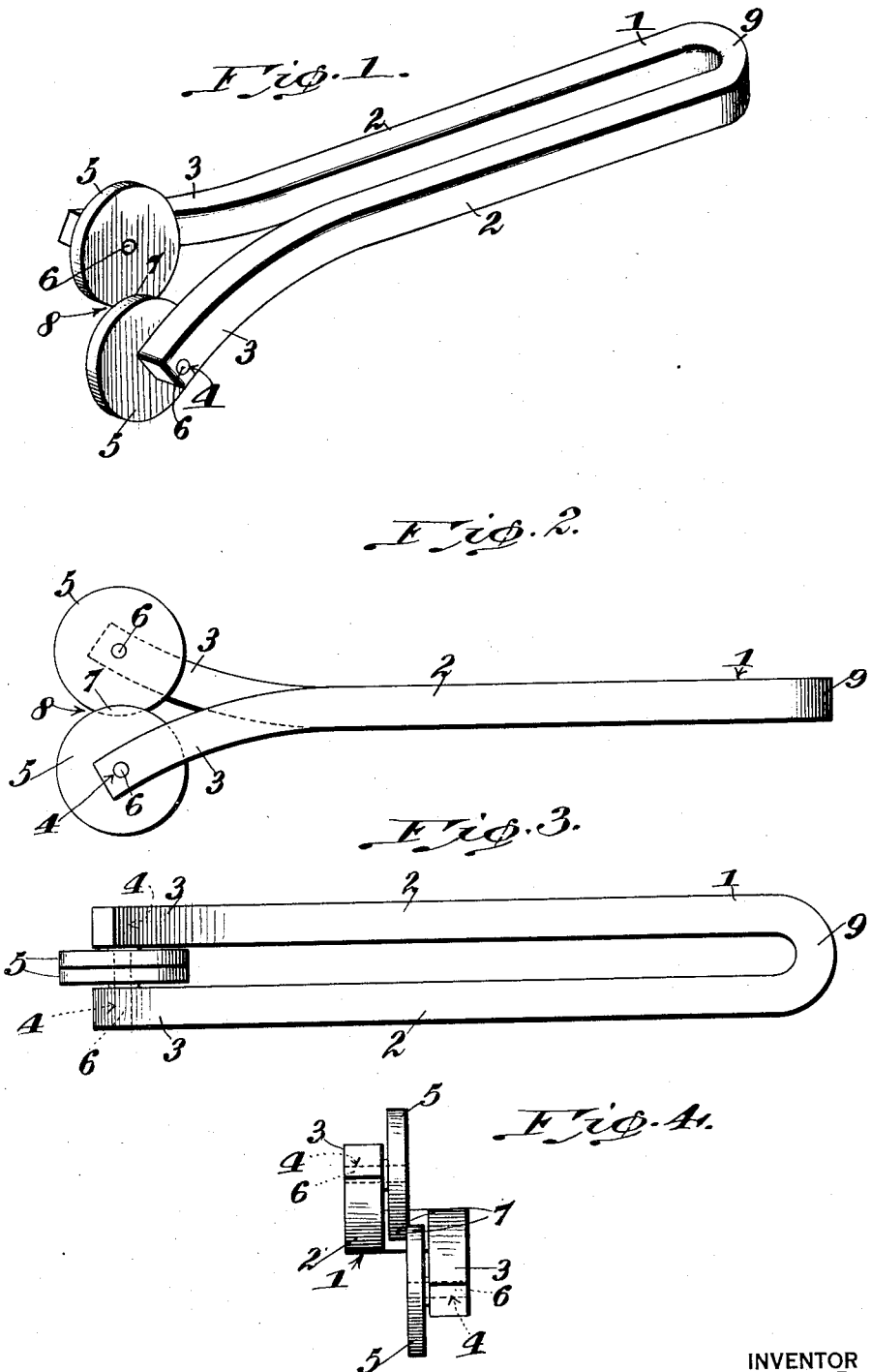

1,952,785

UNITED STATES PATENT OFFICE 1,952,785

ROLLING SHEARS

Archer W. Bedell, Faribault, Minn.

Application October 28, 1933, Serial No. 695,687

5 Claims. (Cl. 164—84)

This invention relates to improvements in shears, and its objects are as follow:

First, to provide a tool for readily trimming paper and other relatively rigid sheet material (within limits), said tool being adapted mainly for hand-use and operable by a straight ahead motion and not by the usual shearing motion as with a scissors.

Second, to provide such a tool with two cutter discs, these being journalled on a U-handle which because of its resilience both presses the faces of the discs together into cutting relationship and holds the disc pintles to their journals.

Third, to provide the foregoing handle with divergent flares or curvatures, these being necessary to properly space the discs, but also having the function of separating the cut portions of the paper and directing them away from the tool and hand.

Fourth, to employ cylindrical cutter discs the peripheries of which actually roll on the material to be cut so that each disc has a motion of rotation against the other to insure the shearing of the material between them.

In the drawing,

Figure 1 is a perspective view of the improved tool or rolling shears as the invention is hereafter called.

Figure 2 is a side elevation particularly illustrating the divergent flares at the extremities of the handle on which the cutter discs are journalled in overlapping but face to face contact.

Figure 3 is a plan view of the shears, and

Figure 4 is a front elevation, particularly illustrating the cylindrical form of the cutter discs.

The shears herein disclosed is intended to enable the ready trimming or cutting of material by simply pushing it frontwards along either an actual or an imaginary line without going through the usual shearing motion as with the familiar scissors. The two cutter discs simply roll along the material, above and below, and shear it as they roll, the operation being a continuous shearing and not a succession of cuts as with the scissors.

In the drawing the handle 1 is made of U-form, the members 2 of which extend side by side in substantial parallelism (Fig. 3) until they reach the extremities 3. These are flared on divergent curvatures so as to space the holes 4 near the tips of each extremity in offset relationship. These holes constitute journals as presently appears.

A pair of cutter discs 5 is situated between the spaced members 2 of the handle 1 at the extremities 3. Each has a pintle 6 preferably made integral with the respective disc and situated at its axial center. These pintles are fitted into the holes 4, and the holes therefore become journals for the pintles and for the discs as clearly seen in the drawing. The degree of divergence of the extremities 3 and the diameter of the discs 5 are such that the discs will overlap at 7 to some extent and produce a cutting point at 8.

The handle 1 is resilient, and its tension at the closed end 9 is such as to tend to close the extremities 3. This tendency presses the faces of the discs 5 together into cutting relationship, and additionally insures holding the pintles 6 in their journals 4, the pintles otherwise being loosely mounted in the journals.

In addition to supporting the discs 5, the divergent extremities 3 have the function of separating the cut portions of the material and directing them away from the shears and the hand which holds the handle. It is readily understood that the material in the course of being severed at the cutting point 8 will have its cut portion nearest to the observer in Figure 2 ride upwardly on the nearest extremity 3, and the other portion ride downwardly on the remote extremity 3. The operating hand will come between and will neither interfere nor be interfered with.

It is to be observed that the discs 5 are cylindrical, the peripheries standing at 90° to the confronting and contacting faces. The success of the rolling discs depends upon their actually rolling on the material to be cut so that each disc has a motion of rotation against the other, thereby shearing the material between them instead of their sliding on the material to be cut without relative motion between the two discs and with consequent failure to shear. The 90° periphery produces maximum contact with the material to be cut as well as the tendency to roll rather than to slide. In practice the cylindrical surface of each cutter disc may be made either smooth as shown, or roughened to increase friction.

Although the handle 1 is resilient to the extent indicated above, it is sufficiently rigid to maintain the cutter discs 5 in a close, but free, relationship. While the tension of the handle is sufficient to normally keep the discs in face to face contact, it is not so great as to prevent separation of the members 2. These are adapted to be slightly separated for the dismounting of the cutter discs 5.

The operation is readily understood. From what has been stated above the handle 1 is simply grasped by one hand and the cutting point 8 presented to the nearest edge of the material to be cut. A push in the direction of the material causes the cutter discs 5 to roll above and below the material while cutting at the point 8. As brought out above the cut will be continuous, and not a series of more or less uneven hacks as with a common scissors.

Although a cylindrical configuration has been prescribed for the discs, the peripheries of the discs may be of conical form, the angle being suitable to the material to be cut. It is also possible to support the discs on the handle in fixed relationship, but the resilient handle is preferred because of its functioning automatically interlocking the discs in their cutting position.

Moreover the resiliency of the handle adapts it to adjustability. Should it be found that the tension presses the discs together a little too tightly a wedge of any sort may be put between the members 2 to hold them apart the proper distance.

I claim:—

1. A shears comprising a pair of cutter discs, a resilient handle so arranged that its tension will press the discs together, and means to journal the discs on the handle in cutting relationship.

2. A shears comprising a pair of cutter discs, a resilient handle of U-form the tension of which tends to close the extremities of the U, and means to journal the discs on said extremities in overlapping and confronting relationship.

3. A shears comprising a pair of cutter discs, a pintle in the axial center of each disc, and a resilient U-handle in the extremities of which the pintles are journalled, the tension of the handle tending to close the extremities thereby simultaneously keeping the disc faces in contact and the pintles in their journals.

4. A shears comprising a pair of cutter discs, a pintle in the axial center of each disc, and a resilient U handle having divergent extremities in which the pintles are journalled to laterally offset the discs in confronting but overlapping relationship, the tension of the handle tending to close the extremities in the axial directions of the pintles.

5. A shears comprising a pair of cutter discs, and a handle of U-form on the extremities of which the discs are turnably mounted with a slight overlap, said handle consisting of resilient material the tension of which presses the faces of the discs together, the passage between the members of the U being adapted to receive adjusting means to hold the discs in proper relationship.

ARCHER W. BEDELL.